United States Patent
Miyachi

(10) Patent No.: US 9,354,300 B2
(45) Date of Patent: May 31, 2016

(54) ULTRASOUND DIAGNOSTIC APPARATUS AND ULTRASOUND IMAGE PRODUCING METHOD

(75) Inventor: Yukiya Miyachi, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 629 days.

(21) Appl. No.: 13/371,884

(22) Filed: Feb. 13, 2012

(65) Prior Publication Data
US 2012/0245467 A1    Sep. 27, 2012

(30) Foreign Application Priority Data
Mar. 25, 2011    (JP) ................................. 2011-068447

(51) Int. Cl.
| | | |
|---|---|---|
| A61B 8/00 | (2006.01) | |
| G01S 7/52 | (2006.01) | |
| G10K 11/34 | (2006.01) | |
| G01S 15/89 | (2006.01) | |

(52) U.S. Cl.
CPC ......... *G01S 7/52038* (2013.01); *G01S 7/52074* (2013.01); *G01S 15/8977* (2013.01); *G10K 11/346* (2013.01); *G01S 7/52085* (2013.01); *G01S 15/895* (2013.01)

(58) Field of Classification Search
CPC ... G01S 7/52038; G01S 7/52049; A61B 8/08; G01N 29/07
See application file for complete search history.

(56) References Cited

U.S. PATENT DOCUMENTS

| | | | |
|---|---|---|---|
| 6,023,977 A * | 2/2000 | Langdon et al. | ................ 73/629 |
| 6,419,632 B1 * | 7/2002 | Shiki | ........................ A61B 8/06 |
| | | | 600/443 |
| 2002/0128555 A1 * | 9/2002 | Maxwell et al. | .............. 600/447 |
| 2004/0210137 A1 * | 10/2004 | Baba et al. | ..................... 600/443 |
| 2008/0166567 A1 | 7/2008 | Habu et al. | |
| 2010/0076312 A1 * | 3/2010 | Katsuyama | .................... 600/443 |
| 2012/0183190 A1 * | 7/2012 | Fukutani et al. | .............. 382/128 |

FOREIGN PATENT DOCUMENTS

| | | | |
|---|---|---|---|
| JP | 61290941 A | | 12/1986 |
| JP | 62072336 A | | 4/1987 |

(Continued)

OTHER PUBLICATIONS

Notification of Reasons for Refusal, dated Feb. 19, 2013, issued in corresponding JP Application No. 2011-068447, 9 pages in English and Japanese.

(Continued)

*Primary Examiner* — Tse Chen
*Assistant Examiner* — Patricia Park
(74) *Attorney, Agent, or Firm* — Sughrue Mion, PLLC

(57) ABSTRACT

An ultrasound diagnostic apparatus includes a region-of-interest setting unit for setting a region of interest in a given region of a B mode image, a controller for controlling a transmission circuit and a reception circuit to transmit ultrasonic beams composed of fundamental waves having a first frequency with forming transmission focuses at a plurality of points set in and near the region of interest and receive ultrasonic echoes having a second frequency, which is a harmonic component of the fundamental waves, thereby to obtain reception data for measuring a sound speed, and a sound speed calculator for calculating ambient sound speeds at the points based on the obtained reception data for measuring a sound speed.

12 Claims, 4 Drawing Sheets

(56) References Cited

FOREIGN PATENT DOCUMENTS

| JP | 08-317926 A | 12/1996 |
| JP | 10043185 A | 2/1998 |
| JP | 2006340886 A | 12/2006 |
| JP | 2008188415 A | 8/2008 |
| JP | 2010-099452 A | 5/2010 |

OTHER PUBLICATIONS

The First Office Action, dated Oct. 8, 2014, issued in corresponding CN Application No. 201210045702.2, 20 pages in English and Chinese.

* cited by examiner

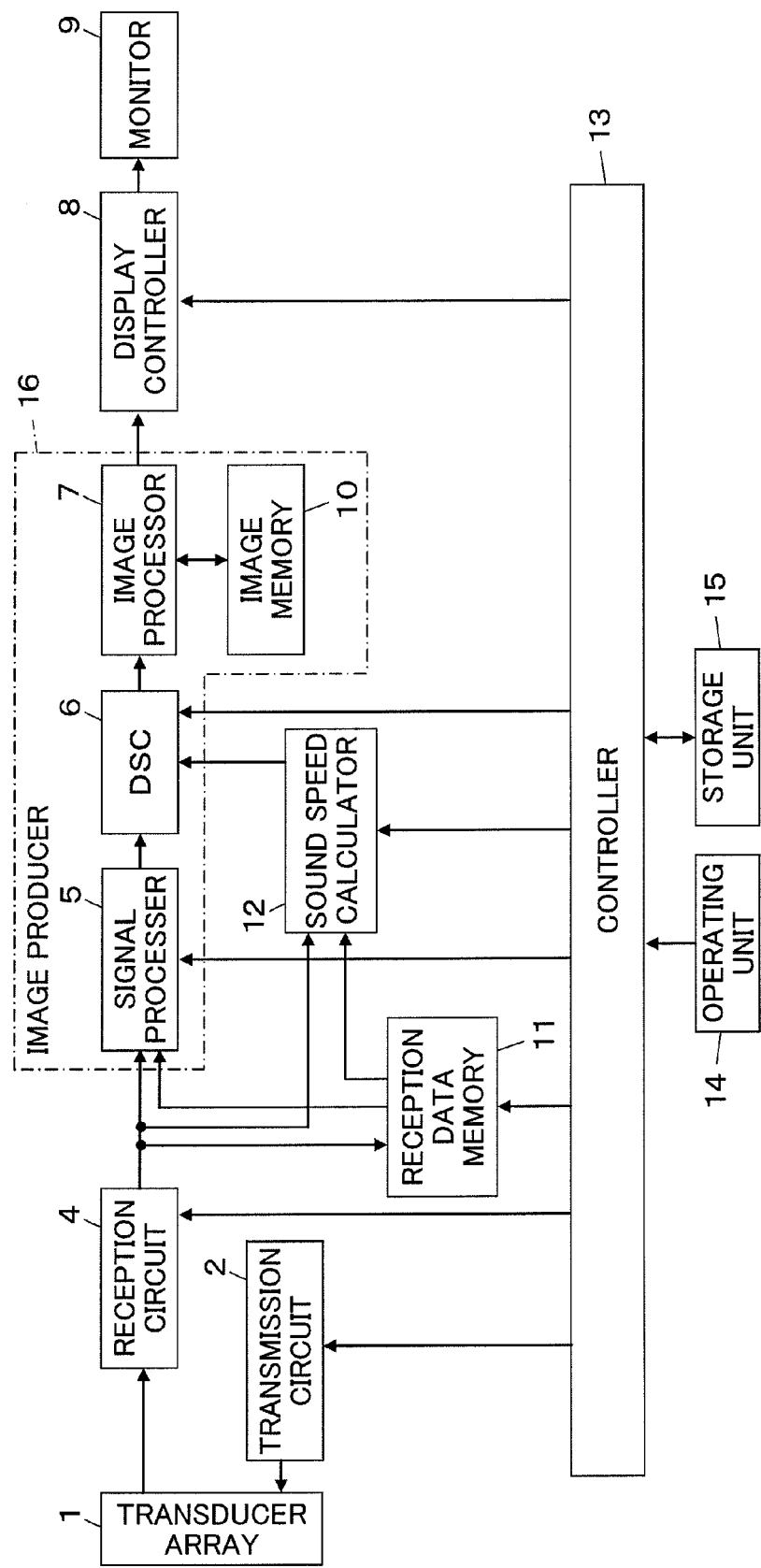

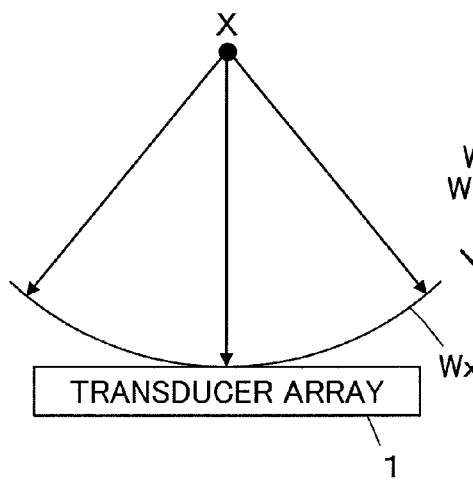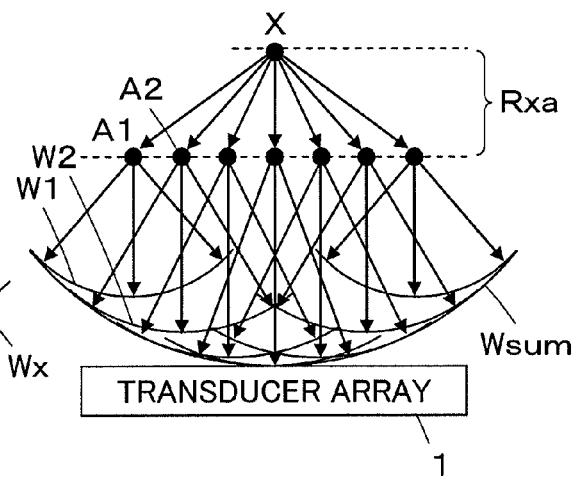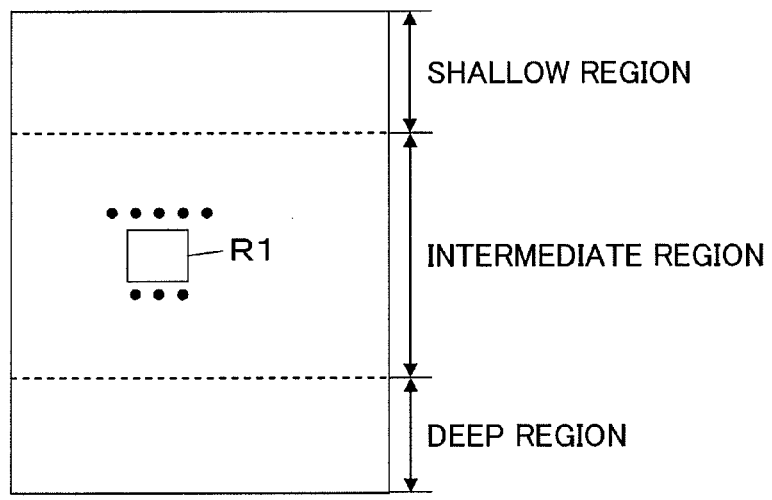

ULTRASOUND DIAGNOSTIC APPARATUS AND ULTRASOUND IMAGE PRODUCING METHOD

BACKGROUND OF THE INVENTION

The present invention relates to an ultrasound diagnostic apparatus and an ultrasound image producing method and particularly to an ultrasound diagnostic apparatus that both produces a B mode image and measures a sound speed by transmitting and receiving ultrasonic waves through a transducer array of an ultrasound probe.

Conventionally, ultrasound diagnostic apparatus using ultrasound images are employed in medicine. In general, this type of ultrasound diagnostic apparatus comprises an ultrasound probe having a built-in transducer array and an apparatus body connected to the ultrasound probe. The ultrasound probe transmits an ultrasonic beam toward the inside of a subject's body, receives ultrasonic echoes from the subject, and the apparatus body electrically processes the reception signals to produce an ultrasound image.

In recent years, sound speeds in a region under examination are measured to achieve a more accurate diagnosis of the region inside the subject's body.

JP 2010-99452 A, for example, proposes an ultrasound diagnostic apparatus whereby a plurality of lattice points are set on the periphery of a site under examination and ultrasonic beams are transmitted and received so as to form a transmission focus at the lattice points to obtain reception data, based on which ambient sound speeds and local sound speeds are calculated.

SUMMARY OF THE INVENTION

JP 2010-99452 A describes a device having an ultrasound probe that transmits and receives ultrasonic beams to and from the inside of a subject's body to obtain ambient sound speeds at a site under examination, thereby enabling display of a B mode image with information on the ambient sound speeds superimposed over it, for example.

However, ambient sound speeds are obtained based on, for example, image contrast and sharpness, and phase displacements and generation of noise, for example, may occur depending on the depth of transmission focuses of the ultrasonic waves and frequencies of the ultrasonic waves, which may make accurate calculations impossible.

An object of the present invention is to provide an ultrasound diagnostic apparatus and an ultrasound image producing method that resolve such problems of the past and enable accurate calculations of an ambient sound speed and a local sound speed.

An ultrasound diagnostic apparatus according to the present invention comprises:

a transducer array;

a transmission circuit for transmitting an ultrasonic beam from the transducer array toward a subject;

a reception circuit for processing reception signals outputted from the transducer array having received ultrasonic echoes from the subject to produce reception data;

an image producer for producing a B mode image based on the reception data obtained by the reception circuit;

a region-of-interest setting unit for setting a region of interest in a given region of the B mode image produced by the image producer;

a controller for controlling the transmission circuit and the reception circuit to transmit ultrasonic beams composed of fundamental waves having a first frequency with forming transmission focuses at a plurality of points set in and near the region of interest and receive ultrasonic echoes having a second frequency, which is a harmonic component of the fundamental waves, thereby to obtain reception data for measuring a sound speed; and a sound speed calculator for calculating ambient sound speeds at the points based on the obtained reception data for measuring a sound speed.

An ultrasound image producing method according to the present invention comprises the steps of:

transmitting an ultrasonic beam from a transducer array toward a subject;

producing reception data based on reception signals outputted from the transducer array having received ultrasonic echoes from the subject;

producing a B mode image based on the obtained reception data;

setting a region of interest in a given region of the produced B mode image;

transmitting ultrasonic beams composed of fundamental waves having a first frequency with forming transmission focuses at a plurality of points set in and near the region of interest and receive ultrasonic echoes having a second frequency, which is a harmonic component of the fundamental waves, thereby to obtain reception data for measuring a sound speed; and calculating ambient sound speeds at the points based on the obtained reception data for measuring a sound speed.

BRIEF DESCRIPTION OF THE DRAWINGS

FIG. 1 is a block diagram illustrating a configuration of an ultrasound diagnostic apparatus according to Embodiment 1 of the invention.

FIGS. 2A and 2B schematically illustrate a principle of sound speed calculation in Embodiment 1.

FIG. 3 illustrates a region of interest set in an intermediate region in Embodiment 1.

DETAILED DESCRIPTION OF THE INVENTION

Figure 4:
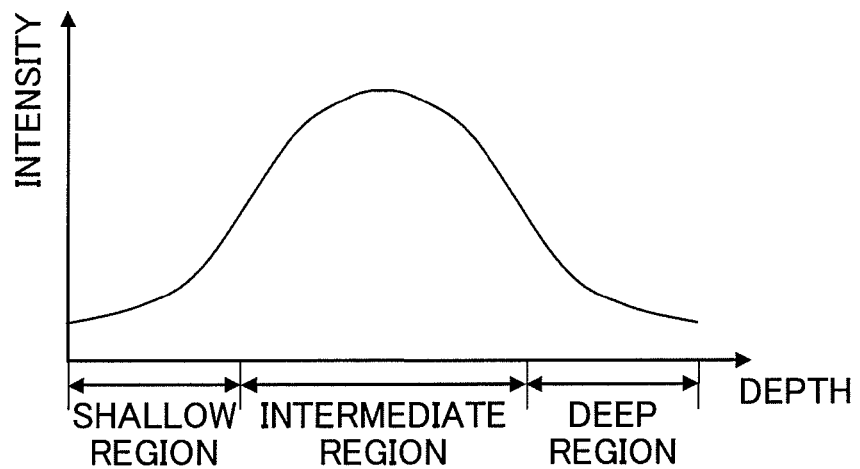
FIG. 4 illustrates an intensity distribution of received ultrasonic echoes in Embodiment 1.

Embodiments of the present invention will now be described below based on the appended drawings.

Embodiment 1

FIG. 1 illustrates a configuration of an ultrasound diagnostic apparatus according to Embodiment 1 of the invention. The ultrasound diagnostic apparatus comprises a transducer array 1, which is connected to a transmission circuit 2 and a reception circuit 4. The reception circuit 4 is connected in sequence to a signal processor 5, a DSC (Digital Scan Converter) 6, an image processor 7, a display controller 8, and a monitor 9. The image processor 7 is connected to an image memory 10. The reception circuit 4 is also connected to a reception data memory 11 and a sound speed calculator 12.

The signal processor 5, the DSC 6, the display controller 8, the reception data memory 11, and the sound speed calculator 12 are connected to a controller 13. The controller 13 is also connected to an operating unit 14 and a storage unit 15.

The transducer array 1 comprises a plurality of ultrasound transducers arranged one-dimensionally or two-dimensionally. These ultrasound transducers each transmit ultrasonic waves according to actuation signals supplied from the transmission circuit 2 and receive ultrasonic echoes from the subject to output reception signals. Each of the ultrasound transducers comprises a vibrator composed of a piezoelectric body and electrodes each provided on both ends of the piezoelectric body. The piezoelectric body is composed of, for example, a piezoelectric ceramic represented by a PZT (titanate zirconate lead), a polymeric piezoelectric device represented by PVDF (polyvinylidene flouride), or a piezoelectric monochristal represented by PMN-PT (lead magnesium niobate lead titanate solid solution).

When the electrodes of each of the vibrators are supplied with a pulsed voltage or a continuous-wave voltage, the piezoelectric body expands and contracts to cause the vibrator to produce pulsed or continuous ultrasonic waves. These ultrasonic waves are combined to form an ultrasonic beam. Upon reception of propagating ultrasonic waves, each vibrator expands and contracts to produce an electric signal, which is then outputted as reception signal for the ultrasonic waves.

The transmission circuit 2 includes, for example, a plurality of pulsars and adjusts the delay amounts for actuation signals based on a transmission delay pattern selected according to an instruction signal transmitted from the transmission controller 13 so that the ultrasonic waves transmitted from a plurality of ultrasound transducers of the transducer array 1 form an ultrasonic beam and supplies the ultrasound transducers with delay-adjusted actuation signals.

The reception circuit 4 amplifies and A/D converts the reception signals transmitted from the respective ultrasonic transducers of the transducer array 1 to produce reception data. The reception circuit 4 has a built-in filter for removing a fundamental wave component of an ultrasonic beam to extract a harmonic component thereof.

The signal processor 5 performs reception focusing processing by providing the reception signals produced by the reception circuit 4 with respective delays according to a sound speed or a sound speed distribution that is set based on a reception delay pattern selected according to the control signal from the controller 13, followed by addition, to produce a sound ray signal where the ultrasonic echoes are well focused and, upon correcting the attenuation according to the distance depending on the depth at which the ultrasonic waves are reflected, performs envelope detection processing to produce a B mode image signal, which is tomographic image information on a tissue inside the subject's body.

The DSC 6 converts the B mode image signal produced by the signal processor 5 into an image signal compatible with an ordinary television signal scanning mode (raster conversion).

The image processor 7 performs various processing required including gradation processing on the B mode image signal entered from the DSC 6 before outputting the B mode image signal to the display controller 8 or storing the B mode image signal in the image memory 10.

The signal processor 5, the DSC 6, the image processor 7, and the image memory 10 constitute an image producer 16.

The display controller 8 causes the monitor 9 to display an ultrasound diagnostic image according to the B mode image signal having undergone image processing by the image processor 7.

The monitor 9 includes a display device such as an LCD, for example, and displays an ultrasound diagnostic image under the control of the display controller 8.

The reception data memory 11 stores the reception data outputted from the reception circuit 4 sequentially by channel. The reception data memory 11 stores information on a frame rate entered from the controller 13 in association with the above reception data. Such information includes, for example, the depth of a position at which the ultrasonic wave is reflected, the density of scan lines, and a parameter representing the range of the visual field.

Under the control by the controller 13, the sound speed calculator 12 calculates an ambient sound speed and a local sound speed based on the reception data stored in the reception data memory 11.

The controller 13 controls the components in the ultrasound diagnostic apparatus according to the instructions entered by the operator using the operating unit 14.

The operating unit 14, provided for the operator to perform input operations, constitutes a region-of-interest setting unit and may be composed of, for example, a keyboard, a mouse, a track ball, and/or a touch panel.

The storage unit 15 stores, for example, an operation program and may be constituted by, for example, a recording medium such as a hard disk, a flexible disk, an MO, an MT, a RAM, a CD-ROM, a DVD-ROM, an SD card, a CF card, or a USB memory, a server, or the like.

The signal processor 5, the DSC 6, the image processor 7, the display controller 8, and the sound speed calculator 12 are each constituted by a CPU and an operation program for causing the CPU to perform various kinds of processing, but they may be each constituted by a digital circuit.

The operator may select one of the following three display modes using the operating unit 14. They are: a mode for displaying the B mode image alone, a mode for displaying the B mode image, with an average local sound speed in the region of interest superimposed over the B mode image, and a mode for displaying the B mode image and an average local sound speed in juxtaposition.

To display the B mode image, a plurality of ultrasound transducers of the transducer array 1 first transmit ultrasonic waves according to the actuation signals supplied from the transmission circuit 2, and the ultrasound transducers having received ultrasonic echoes from the subject output the reception signals to the reception circuit 4, which produces the reception data. The signal processor 5, having received the reception data, produces the B mode image signal, the DSC 6 performs raster conversion of the B mode image signal, and the image processor 7 performs various image processing on the B mode image signal, whereupon, based on this B-mode image signal, the display controller 8 causes the monitor 9 to display the ultrasound diagnostic image.

The ambient sound speed and the local sound speed may be calculated by, for example, a method described in JP 2010-99452 A filed by the Applicant of the present application.

This method obtains the local sound speed at a lattice point X according to the Huygens principle. Suppose now that, on transmission of ultrasonic waves to the inside of a subject, a reception wave Wx reaches the transducer array 1 from the lattice point X, a reflection point in the subject, as illustrated in FIG. 2A, and that a plurality of lattice points A1, A2, . . . are arranged at equal intervals in positions shallower than the lattice point X, i.e., closer to the transducer array 1, as illustrated in FIG. 2B. Then, the local sound speed at the lattice point X is obtained according to the Huygens principle whereby a synthesized wave Wsum produced by combining reception waves W1, W2, . . . transmitted from the lattice points A1, A2, . . . having received a reception signal from the lattice point X coincides with the reception wave Wx from the lattice point X.

First, ambient sound speeds for all the lattice points X, A1, A2, . . . are obtained. The ambient sound speed herein means a sound speed allowing a highest image contrast and sharpness to be obtained as a set sound speed is varied after performing focus calculation for the lattice points based on the set sound speed and imaging to produce an ultrasound image. The ambient sound speed may be judged based on, for example, the image contrast, spatial frequency in the scan direction, and dispersion as described in JP 08-317926 A.

Next, the ambient sound speed for the lattice point X is used to calculate the waveform of an imaginary reception wave Wx emitted from the lattice point X.

Further, a hypothetical local sound speed V at the lattice point X is changed to various values to calculate the imaginary synthesized wave Wsum of the reception waves W1, W2, ... from the lattice points A1, A2, ... Suppose that, at this time, the sound speed is consistent in a region Rxa between the lattice point X and the lattice points A1, A2, ... and is equivalent to the local sound speed V at the lattice point X. The times in which the ultrasonic wave propagating from the lattice point X reaches the lattice points A1, A2, ... are XA1/V, XA2/V, ..., respectively, where XA1, XA2, ... are the distances between the lattice point X and the lattice points A1, A2, ... Combining the reflected waves emitted from the lattice points A1, A2, ... with respective delays corresponding to the times XA1/V, XA2/V, ... yields the imaginary synthesized wave Wsum.

Next, the respective differences between a plurality of the imaginary synthesized waves Wsum calculated by changing the hypothetical local sound speed V at the lattice point X to various values and the imaginary reception waves Wx from the lattice point X are calculated to determine the hypothetical local sound speed V at which the difference becomes a minimum as the local sound speed. The difference between the imaginary synthesized waves Wsum and the imaginary reception waves Wx from the lattice point X may be calculated by any of appropriate methods including a method using the cross-correlation, a method using phase matching addition by multiplying the reception waves Wx by a delay obtained from the synthesized wave Wsum, and a method using phase matching addition by multiplying the synthesized wave Wsum by a delay obtained from the reception waves Wx.

Thus, the ambient sound speeds and the local sound speeds inside a subject can be accurately calculated based on the reception data produced by the reception circuit 4. The sound speed map representing a distribution of the local sound speeds in a set region of interest may be likewise produced.

Next, the operation of Embodiment 1 will be described.

First, according to the actuation signal from the transmission circuit 2, a plurality of ultrasound transducers of the transducer array 1 transmit an ultrasonic beam, and the ultrasound transducers having received ultrasound echoes from a subject output reception signals to the reception circuit 4 to produce reception data, whereupon the display controller 8 causes the monitor 9 to display the B mode image based on the B mode image signal produced by the image producer 16.

As illustrated in FIG. 3, the B mode image displayed on the monitor 9 is divided by the controller 13 into three regions, a shallow region, an intermediate region, and a deep region in the depth direction, and an operation made by the operator on the operating unit 14 sets a region of interest R1 in the intermediate region of the B mode image. Then, the controller 13 sets lattice points in positions and in a number adapted for the region of interest R1 set in the B mode image. For example, a plurality of lattice points is set in positions shallower and deeper than the region of interest R1 so as to sandwich the region of interest R1 in the depth-wise direction.

Subsequently, the controller 13 controls the transmission circuit 2 to transmit ultrasonic beams for measuring the sound speed each composed of fundamental waves having a low frequency H1 so as to form a transmission focus at the lattice points set specifically for the region of interest R1. The ultrasonic beams for measuring the sound speed transmitted toward the respective lattice points travel in the subject to form a transmission focus at the lattice points and be reflected before traveling in the subject back to the ultrasound transducers of the transducer array 1 for reception.

Thus, setting the fundamental waves to the low frequency H1 enables suppression of phase displacement in the ultrasonic waves composing the ultrasonic beams occurring as the ultrasonic beams for measuring the sound speed travel through an inconsistent medium inside the subject, and the transmission focuses are formed by the ultrasonic waves coming in phase with each other at the positions of lattice points.

Traveling inside the subject, the ultrasonic beam for measuring the sound speed acquires a harmonic component having a frequency that is an integral multiple of the frequency H1 of the fundamental wave. As ultrasonic echoes containing the thus acquired harmonic component are received by the ultrasound transducers, the controller 13 controls the reception circuit 4 to remove the reception signal of the fundamental wave through the filter provided in the reception circuit 4 and capture the reception signal of ultrasonic echoes having a high frequency H2, the harmonic component of the fundamental wave. Preferably, a harmonic component composed of a frequency that is, for example, double the frequency H1 of the fundamental wave may be captured.

Thus, the reception circuit 4 produces reception data D1 for measuring the sound speed each time ultrasonic echoes are received, and the produced reception data D1 for measuring the sound speed are sequentially stored in the reception data memory 11. When the reception data D1 for measuring the sound speed obtained by transmitting and receiving the ultrasonic beams for all the lattice points have been stored in the reception data memory 11, the sound speed calculator 12 calculates the ambient sound speeds at the lattice points based on the reception data D1 for measuring the sound speed. The ambient sound speed is calculated based on the contrast and sharpness of an image. Because ultrasonic echoes composed of harmonic components having the high frequency H2 as compared with the fundamental wave component has an enhanced main lobe and reduced side lobes, the effects of noise on the ambient sound speed obtained as above are suppressed.

The sound speed calculator 12 may also calculate the local sound speeds in a region between the lattice points and in the region of interest R1 based on the ambient sound speeds obtained as above. On the assumption that the sound speed is consistent in a region between the lattice points set in positions deeper and shallower than the region of interest R1, the local sound speeds in that region are calculated using the reception data D1 for measuring the sound speed stored in the reception data memory 11.

As described above referring to FIG. 2B, the synthesized wave of reception waves from the lattice points located in the shallower positions having received reception waves from the lattice points located in positions deeper than the region of interest R1 coincides with the reception waves from the lattice points in the deeper positions according to the Huygens principle. Using this fact, the local sound speeds in the region between the shallower and the deeper positions can be calculated. When more than one such region between the shallower and the deeper positions are set so as to surround the region of interest R1, the sound speed calculator 12 may use an average of the local sound speeds in the respective regions as the local sound speed in the region of interest R1.

The positions of the three regions, the shallow region, the intermediate region, and the deep region, into which the B mode image is divided in depth-wise direction, may be determined, for example, as follows.

The intensity of an ultrasonic wave decreases with the distance it travels, whereas the intensity of the harmonic component, which is generated as the ultrasonic wave travels, increases. Accordingly, the intensity distribution of the ultrasonic echoes composed of harmonic components having the high frequency H2 obtained by transmitting an ultrasonic beam composed of fundamental wave component having a low frequency H1 exhibits a curve reaching a maximum at a given depth as illustrated in FIG. 4. Therefore, the controller 13 sets the intermediate region in a region where the intensity is expected to be above a given value while setting the shallow region and the deep region respectively in regions, where the intensity is not expected to be above the given value, i.e., in positions shallower and deeper than the intermediate region, according to the intensity distribution of the ultrasonic echoes.

Thus, phase displacement at focusing positions is limited by forming the transmission focuses with ultrasonic beams having the low frequency H1, while the effects of noise in the reception waves are suppressed by receiving ultrasonic echoes having the high frequency H2. Therefore, the ambient sound speeds and the local sound speeds can be calculated accurately.

Preferably, the controller 13 controls the transmission circuit 2 and the reception circuit 4 so that the frequency H1 of the fundamental waves of a transmitted ultrasonic beam is lower than the central frequency of which the ultrasound probe is capable, while the frequency H2 of the harmonic components of a received ultrasonic beam is higher than the central frequency of which the ultrasound probe is capable.

With an ultrasound probe capable of a frequency band of 1 MHz to 5 MHz and a central frequency of 3 MHz, the controller 13 may control the transmission circuit 2 and the reception circuit 4 to transmit ultrasonic beams having a fundamental wave with the frequency H1 of 2 MHz to form a transmission focus at the respective lattice points in the region of interest R1 set in the intermediate region and receive ultrasonic echoes having a harmonic component with the frequency H2 of 4 MHz.

Embodiment 2

Although in Embodiment 1 the region of interest R1 is set in the intermediate region of the B mode image, the region of interest may be also set in the shallow region and the deep region as well.

Figure 5:
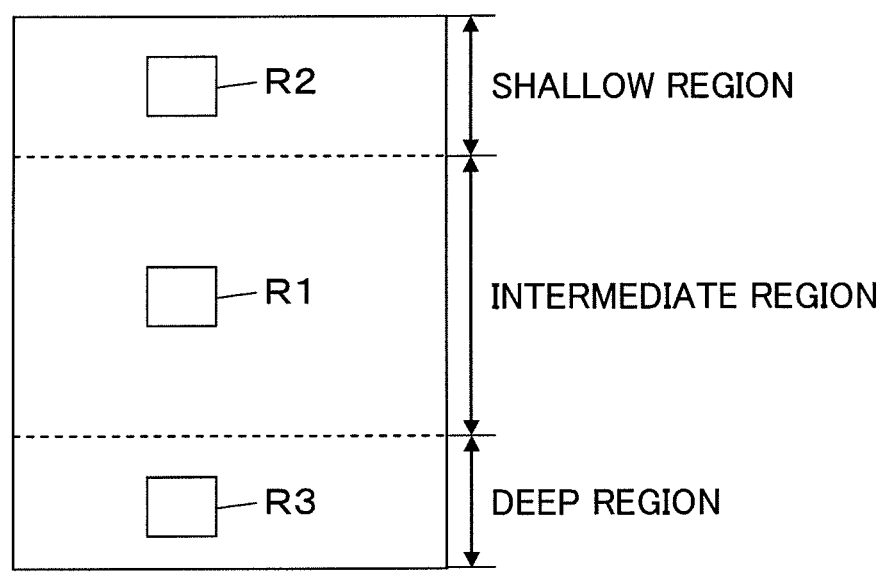
FIG. 5 illustrates regions of interest set in Embodiment 2.
Figure 6:
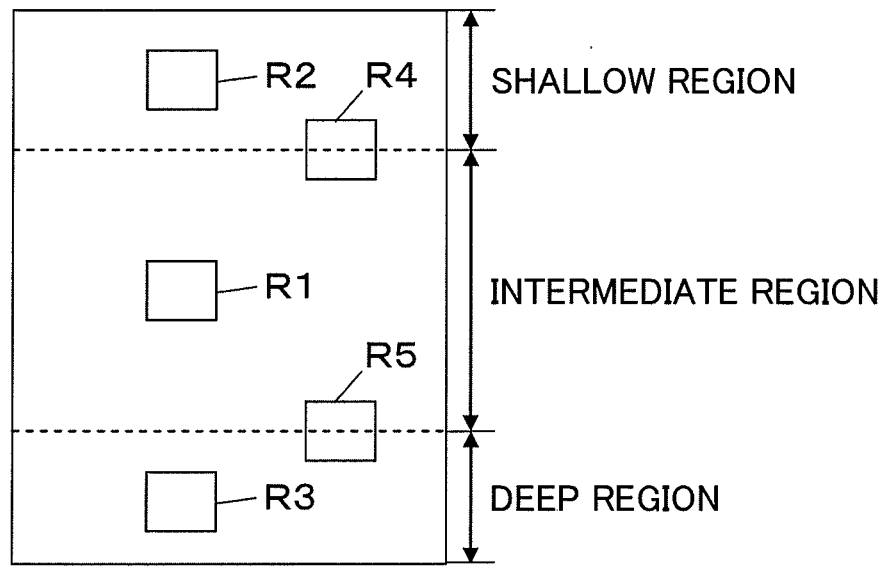
FIG. 6 illustrates regions of interest set in a variation of Embodiment 2.

As illustrated in FIG. 5, for example, a region of interest R2 is set in the shallow region, and a region of interest R3 is set in the deep region. The controller 13 sets lattice points in an number and positions each adapted specifically for the regions of interest R1, R2, and R3, respectively and causes the ultrasonic beams for measuring the sound speed to be transmitted and received so as to form the transmission focus at the set lattice points.

For the region of interest R1 set in the intermediate region, the transmission focuses are formed with ultrasonic beams composed of fundamental waves having a low frequency H1 while ultrasonic echoes composed of harmonic components having the high frequency H2 are received to obtain reception data D1 for measuring the sound speed, based on which the ambient sound speeds at the lattice points are calculated likewise as according to Embodiment 1.

For the region of interest R2 set in the shallow region, the controller 13 controls the transmission circuit 2 and the reception circuit 4 to transmit ultrasonic beams for measuring the sound speed having the high frequency H2 so as to form the transmission focus at the lattice points in an number and positions each adapted specifically for the region of interest R2 and receive ultrasonic echoes having the high frequency H2 from the lattice points in order to obtain the reception data D2 for measuring the sound speed. Based on the reception data D2 for measuring the sound speed thus obtained, the ambient sound speeds at the respective lattice points adapted specifically for the region of interest R2 in the shallow region are calculated by the sound speed calculator 12.

As compared with an ultrasonic beam having a low frequency, an ultrasonic beam having a high frequency has an enhanced main lobe and reduced side lobes in exchange for a large phase displacement generated as the beam travels through an inconsistent medium inside the subject. Therefore, the effects of noise in reception waves can be suppressed by transmitting and receiving an ultrasonic beam having the high frequency H2 in the shallow region where the distance of travel is short and the effects of phase displacement are small, and the ambient sound speeds can be calculated accurately. Further, because ultrasonic echoes having the same frequency as the frequency H2 of the ultrasonic echoes received from the region of interest R1 set in the intermediate region are received from the region of interest R2 to calculate the ambient sound speeds, the difference in ambient sound speed between the intermediate region and the shallow region due to the difference in frequency of received ultrasonic echoes can be held to a minimum.

For the region of interest R3 set in the deep region, the controller 13 controls the transmission circuit 2 and the reception circuit 4 to transmit ultrasonic beams for measuring the sound speed having the low frequency H1 so as to form the transmission focus at the lattice points in a number and positions adapted specifically for the region of interest R3 and receive ultrasonic echoes having the low frequency H1 from the lattice points to obtain the reception data D3 for measuring the sound speed. Based on the reception data D3 for measuring the sound speed thus obtained, the ambient sound speeds at the respective lattice points set specifically for the region of interest R3 in the deep region are calculated by the sound speed calculator 12.

As compared with an ultrasonic beam having a high frequency, an ultrasonic beam having a low frequency develops only a small phase displacement as it travels through an inconsistent medium. Therefore, the ambient sound speed can be calculated accurately by transmitting and receiving an ultrasonic beam having the low frequency H1 in the deep region where the travel distance is long and, hence, the effects of phase displacement tend to increase. Further, because ultrasonic beams having the same frequency as the frequency H1 of the ultrasonic beams transmitted to the region of interest R1 set in the intermediate region are transmitted to the region of interest R3 to calculate the ambient sound speeds, the difference in ambient sound speed from the intermediate region due to the difference in frequency of transmitted ultrasonic beams can be held to a minimum.

When an operation made on the operating unit 14 sets a region of interest R4 on the border between the shallow region and the intermediate region of the B mode image and a region of interest R5 on the border between the intermediate region and the deep region, the ambient sound speeds are obtained by the above method separately in the respective regions where the lattice points set in positions and numbers each adapted to suit the regions of interest R4 and 5 are located.

For the lattice points located in the shallow region among those set in the region of interest R4, ultrasonic beams for measuring the sound speed having the high frequency H2 are transmitted and received to obtain the ambient sound speeds based on the acquired reception data D2 for measuring the sound speed. For the lattice points located in the intermediate region, ultrasonic beams having the low frequency H1 are transmitted, while ultrasonic beams having the high frequency H2 are received to obtain the ambient sound speeds based on the acquired reception data D1 for measuring the sound speed.

As regards the lattice points set in the region of interest R5, for the lattice points located in the intermediate region, ultrasonic beams having the low frequency H1 are transmitted, while ultrasonic beams having the high frequency H2 are received to obtain the ambient sound speeds based on the acquired reception data D1 and D3 for measuring the sound speed.

Based on the ambient sound speeds thus obtained, the local sound speeds may also be obtained using the imaginary synthesized wave. Preferably, the frequency of the imaginary synthesized wave is set to the low frequency H1 or the high frequency H2 used for the intermediate region.

Because the ambient sound speeds are obtained specifically for each region where the lattice points are located, accurate ambient sound speeds and local sound speeds can be obtained.

Embodiment 3

Although in Embodiments 1 and 2 the average local sound speed in the region of interest R is measured, a sound speed map in the region of interest R may be also produced.

Figure 7:
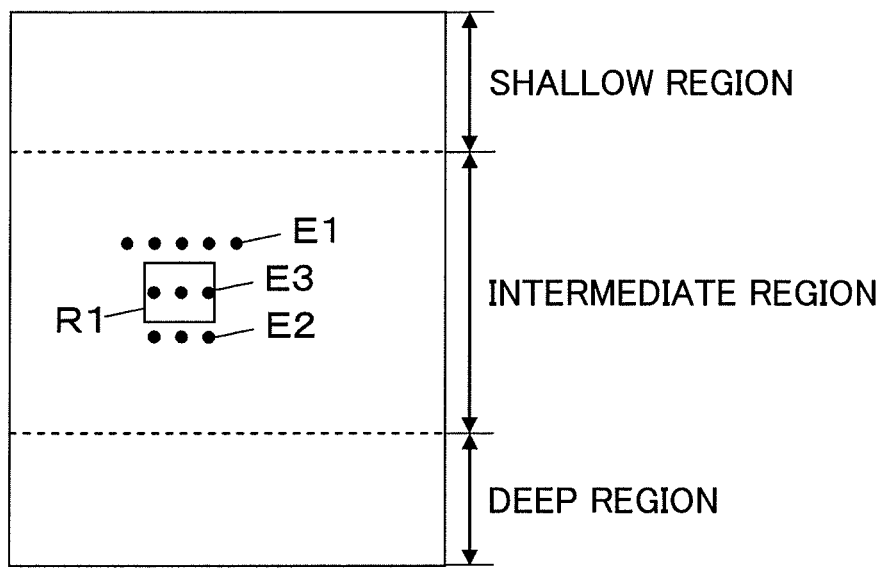
FIG. 7 illustrates lattice points set in Embodiment 3.

When, for example, an operation made on the operating unit 14 sets the region of interest R1 in the intermediate region, the controller 13 sets lattice points E1 and E2 in positions shallower and deeper than the region of interest R1, respectively, and sets lattice points E3 for measuring the sound speed in a position between the lattice points E1 and E2 as illustrated in FIG. 7.

Subsequently, the controller 13 controls the transmission circuit 2 and the reception circuit 4 to form the transmission focus at the lattice points E3 for the sound speed map and at the lattice points E1 and E2, sequentially transmitting ultrasonic beams having the low frequency H1 while receiving ultrasonic echoes having the high frequency H2, and the reception data for measuring the sound speed produced by the reception circuit 4 are sequentially stored in the reception data memory 11. Then, the sound speed calculator 12 uses the reception data on the lattice points E1 and E2 stored in the reception data memory 11 to calculate the ambient sound speeds and the local sound speeds likewise as according to Embodiment 1 and also uses the reception data on the lattice points E1 and E2 and the reception data for the sound speed map on the lattice points E3 for the sound speed map to calculate the local sound speeds at the lattice points E1, E2, and E3 thereby to produce the sound speed map in the region of interest R1.

The data on the sound speed map produced by the sound speed calculator 12 undergo raster conversion by the DSC 6 and various image processing by the image processor 7 before being transmitted to the display controller 8. Then, according to the display mode entered from the operating unit 14 by the operator, the B mode image is displayed on the monitor 9, with the sound speed map superimposed over it (e.g., display with color distinction or by varying luminance according to the local sound speed, or display where points having an equal local sound speed are connected by a line), or the B mode image and the sound speed map are displayed in juxtaposition on the monitor 9.

Thus, not only the sound speeds or the local sound speeds can be measured but the production of both the B mode image and the sound speed map can be achieved.

While, in Embodiments 1 to 3, the reception data outputted from the reception circuit 4 are provisionally stored in the reception data memory 11, and the sound speed calculator 12 uses the reception data stored in the reception data memory 11 to calculate the ambient sound speeds and the local sound speeds, the sound speed map producer 12 may directly receive the reception data outputted from the reception circuit 4 to calculate the ambient sound speeds and the local sound speeds.

What is claimed is:

1. An ultrasound diagnostic apparatus comprising:
   a transducer array;
   a transmission circuit for transmitting an ultrasonic beam from the transducer array toward a subject;
   a reception circuit for processing reception signals outputted from the transducer array having received ultrasonic echoes from the subject to produce reception data;
   an image producer for producing a B mode image based on the reception data obtained by the reception circuit;
   a controller for controlling the transmission circuit and the reception circuit to transmit ultrasonic beams composed of fundamental waves having a first frequency from the transducer array toward the subject and receive ultrasonic echoes having a second frequency, which is a harmonic component of the fundamental waves, to divide the B mode image into an intermediate region in a depth region where an intensity of the ultrasonic echoes having the second frequency is above a given value, a shallow region in positions shallower than the intermediate region, and a deep region in positions deeper than the intermediate region;
   a region-of-interest setting unit for setting in the B mode image produced by the image producer an intermediate region of interest in the intermediate region, a shallow region of interest in the shallow region and a deep region of interest in the deep region; and
   a sound speed calculator,
   the controller controlling the transmission circuit and the reception circuit to transmit ultrasonic beams having the first frequency with forming transmission focuses at a plurality of intermediate points set in and near the intermediate region of interest and receive ultrasonic echoes having the second frequency to obtain intermediate reception data for measuring a sound speed, to transmit ultrasonic beams having the second frequency with forming transmission focuses at a plurality of shallow points set in and near the shallow region of interest and receive ultrasonic echoes having the second frequency to obtain shallow reception data for measuring a sound speed, and to transmit ultrasonic beams having the first frequency with forming transmission focuses at a plurality of deep points set in and near the deep region of interest and receive ultrasonic echoes having the first frequency to obtain deep reception data for measuring a sound speed,
   the sound speed calculator calculating ambient sound speeds at the intermediate points based on the obtained intermediate reception data for measuring a sound speed, calculating ambient sound speeds at the shallow points based on the obtained shallow reception data for measuring a sound speed, and calculating ambient sound speeds at the deep points based on the obtained deep reception data for measuring a sound speed.

2. The ultrasound diagnostic apparatus according to claim 1, wherein the controller sets the first frequency at a value lower than a central frequency of the transducer array and sets the second frequency at another value higher than the central frequency of the transducer array.

3. The ultrasound diagnostic apparatus according to claim 2,
wherein the transducer array has a frequency band of 1 MHz to 5 MHz and the central frequency of 3 MHz, and
wherein the controller sets the first frequency of 2 MHz and the second frequency of 4 MHz.

4. The ultrasound diagnostic apparatus according to claim 1,
wherein the region-of-interest setting unit sets an additional region of interest over at least one of a border between the shallow region and the intermediate region and a border between the intermediate region and the deep region,
wherein the controller controls the transmission circuit and the reception circuit to transmit and receive ultrasonic beams having the second frequency for a plurality of additional points set in and near the additional region of interest and located in the shallow region, to transmit ultrasonic beams having the first frequency and receive ultrasonic echoes having the second frequency for a plurality of additional points set in and near the additional region of interest and located in the intermediate region, and to transmit and receive ultrasonic beams having the first frequency for a plurality of additional points set in and near the additional region of interest and located in the deep region, thereby to obtain additional reception data for measuring a sound speed, and
wherein the sound speed calculator calculates ambient sound speeds at the additional points based on the obtained additional reception data for measuring a sound speed.

5. The ultrasound diagnostic apparatus according to claim 4, wherein the controller sets the first frequency at a value lower than a central frequency of the transducer array and sets the second frequency at another value higher than the central frequency of the transducer array.

6. The ultrasound diagnostic apparatus according to claim 5,
wherein the transducer array has a frequency band of 1 MHz to 5 MHz and the central frequency of 3 MHz, and
wherein the controller sets the first frequency of 2 MHz and the second frequency of 4 MHz.

7. The ultrasound diagnostic apparatus according to claim 1, wherein, based on the ambient sound speeds obtained by transmitting and receiving ultrasonic beams for the points, the sound speed calculator calculates local sound speeds in regions between the points.

8. The ultrasound diagnostic apparatus according to claim 4, wherein, based on the ambient sound speeds obtained by transmitting and receiving ultrasonic beams for the points, the sound speed calculator calculates local sound speeds in regions between the points.

9. The ultrasound diagnostic apparatus according to claim 1,
wherein the controller controls the transmission circuit and the reception circuit to transmit and receive ultrasonic beams with forming transmission focuses at a plurality of points for a sound speed map set in and near the region of interest, thereby to obtain reception data for a sound speed map, and
wherein the sound speed calculator calculates local sound speeds at the points for a sound speed map based on reception data for a sound speed map to produce a sound speed map of the region of interest.

10. The ultrasound diagnostic apparatus according to claim 4,
wherein the controller controls the transmission circuit and the reception circuit to transmit and receive ultrasonic beams with forming transmission focuses at a plurality of points for a sound speed map set in and near the region of interest, thereby to obtain reception data for a sound speed map, and
wherein the sound speed calculator calculates local sound speeds at the points for a sound speed map based on reception data for a sound speed map to produce a sound speed map of the region of interest.

11. An ultrasound image producing method, comprising the steps of:
transmitting an ultrasonic beam from a transducer array toward a subject;
producing reception data based on reception signals outputted from the transducer array having received ultrasonic echoes from the subject;
producing a B mode image based on the obtained reception data;
transmitting ultrasonic beams composed of fundamental waves having a first frequency from the transducer array toward the subject and receive ultrasonic echoes having a second frequency, which is a harmonic component of the fundamental waves, to divide the B mode image into an intermediate region in a depth region where an intensity of the ultrasonic echoes having the second frequency is above a given value, a shallow region in positions shallower than the intermediate region, and a deep region in positions deeper than the intermediate region;
setting in the produced B mode image an intermediate region of interest in the intermediate region, a shallow region of interest in the shallow region and a deep region of interest in the deep region;
transmitting ultrasonic beams having the first frequency with forming transmission focuses at a plurality of intermediate points set in and near the intermediate region of interest and receiving ultrasonic echoes having the second frequency to obtain intermediate reception data for measuring a sound speed, transmitting ultrasonic beams having the second frequency with forming transmission focuses at a plurality of shallow points set in and near the shallow region of interest and receiving ultrasonic echoes having the second frequency to obtain shallow reception data for measuring a sound speed, and transmitting ultrasonic beams having the first frequency with forming transmission focuses at a plurality of deep points set in and near the deep region of interest and receiving ultrasonic echoes having the first frequency to obtain deep reception data for measuring a sound speed; and
calculating ambient sound speeds at the intermediate points based on the obtained intermediate reception data for measuring a sound speed, calculating ambient sound speeds at the shallow points based on the obtained shallow reception data for measuring a sound speed, and calculating ambient sound speeds at the deep points based on the obtained deep reception data for measuring a sound speed.

12. The according of claim 1, wherein in the shallow region and the deep region, the intensity of ultrasonic echoes is not expected to be above the given value.

* * * * *